(12) United States Patent
Jeffery et al.

(10) Patent No.: US 8,613,027 B2
(45) Date of Patent: Dec. 17, 2013

(54) SYSTEM AND METHOD FOR SIGNAL RECEPTION AND DISTRIBUTION

(75) Inventors: Ross Jeffery, Ottawa (CA); Spenser Williams, Ottawa (CA)

(73) Assignee: NorthVu Systems, Inc., Ottawa, Ontario (CA)

( * ) Notice: Subject to any disclaimer, the term of this patent is extended or adjusted under 35 U.S.C. 154(b) by 173 days.

(21) Appl. No.: 13/212,760

(22) Filed: Aug. 18, 2011

(65) Prior Publication Data

US 2012/0044426 A1    Feb. 23, 2012

(30) Foreign Application Priority Data

Aug. 18, 2010 (CA) ...................................... 2713655

(51) Int. Cl.
*H04N 7/20*    (2006.01)

(52) U.S. Cl.
USPC ............................... 725/72; 725/71; 725/134

(58) Field of Classification Search
USPC .............. 725/71–72, 134, 139, 149
See application file for complete search history.

(56) References Cited

U.S. PATENT DOCUMENTS

| 2004/0130667 A1* | 7/2004 | Hibino et al. | 348/731 |
| 2011/0055864 A1* | 3/2011 | Shah et al. | 725/31 |

* cited by examiner

*Primary Examiner* — Hunter B Lonsberry
(74) *Attorney, Agent, or Firm* — Womble Carlyle Sandridge & Rice, LLP

(57) ABSTRACT

A system and method for receiving and distributing an over-the-air signal over a network. At least one antenna receives an over-the-air signal containing a plurality of channels, at least one tuner isolates from the over-the-air signal information associated with a selected channel and produces an intermodulated carrier wave associated with the selected channel, at least one demodulator demodulates the intermodulated carrier wave to produce a data stream in a first format. Optionally a processor (for example a transcoder) converts the data stream in a first format into a second format. A communications interface produces a network transport stream from the data stream in the second format and distributes the network transport stream over the network. A line coupling unit (LCU) sets resistance/capacitance values which optimize the signal for distribution.

30 Claims, 13 Drawing Sheets

| All Categories | | | Thu 15 May 18:40 |
|---|---|---|---|
| Today | 18:30 | 19:00 | 19:30 | 20:00 |
| 001 BBC ONE | North West Tonight | The One Show | EastEnders | Holby Blue △ |
| 002 BBC TWO | Great Britain Menu | Jonathan Meades M... | Women in Black | Living the Dream... △ |
| 003 ITV1 | ITV Evening News a... | Emmerdale | | No Event Information |
| 004 Channel 4 | Hollyoaks | Channel 4 News | No Event Information | |
| 005 Five | Monkey Life | Five Me... | No Event Information | |
| 006 ITV2 | — Judge Judy | Smallville | | No Event Information |
| 007 BBC THREE | This is BBC THREE | Spendaholics | | Blood, Sweat an... △ |
| 008 BBC FOUR | This is BBC FOUR | World Today | In Search of Mediev... | All About Thunde... △ |
| 009 ITV3 | Heartbeat | Dempsey and Makepeace | | No Event Information |
| 011 SKY THREE | Shear Genius | Project Runway | | No Event Information |

◁▷△▽ Select    Tune    Program Information    +/- 1 day on/off    (Return) Back

FIG. 10

SYSTEM AND METHOD FOR SIGNAL RECEPTION AND DISTRIBUTION

TECHNICAL FIELD

The present application generally relates to a system and method for a signal reception and distribution.

TECHNICAL BACKGROUND

Audio/video content can be broadcasted via an over-the-air signal. The content may be captured with an antenna and displayed on a display device such as a television. The over-the-air carrier signal typically comprises signal information associated with a plurality of separate channels each modulated to a distinct frequency. A tuner is used to isolate information from a single channel within the broadcast signal. In the case of a tuner external to the display device (for example, a "set top box" or STB), the signal information is processed (for example modulated to a particular frequency), and the external tuner outputs an audio/video stream of which the video component is displayed on the television and the audio component is played through an internal or external amplifier.

Antennas for receiving over-the-air signals are conventionally mounted in elevated locations and preferably outdoors in order to maximize the signal strength and thus the quality of the signal. Antennas which are placed indoors on a ground floor or in a basement, for example in a home or business, typically receive a lower quality (i.e. low strength) over-the-air signal, and the outputted audio/video stream transmitted to the receiving device is of commensurately poor quality. However, in order to connect an antenna mounted in an elevated location and/or outdoors with receiving devices such as televisions located within the premises on the ground floor or in the basement, long stretches of wiring is needed. The wiring used is not aesthetically appealing, and it can be difficult to conceal the wiring from view. Locating such wiring in a way that does not interfere with normal use of the premises can result in an unsightly and convoluted path about the structure. Additionally, long stretches of wiring and multiple connections may cause signal degradation. Other challenges associated with antennas include geographic spacing of signal sources and optimization for a particular frequency range (for example, either UHF or VHF).

It would be advantageous to provide a system where antenna for receiving an over-the-air audio/video signal could be placed in a location where signal reception is maximized but long stretches of unattractive wiring to connect the antenna to a receiving device is not required. Instead, content could be delivered over an existing network, such as a wireless network, a wired network, a LAN, a WAN, or the like. It would also be advantageous to provide a system to reduce signal loss or degradation due to attenuation between the antenna and the tuner by reducing the physical distance between said components. It would also be advantageous to provide a system for distributing content received from an over-the-air audio/video signal to a plurality of receiving devices. It would also be advantageous to provide a system with a plurality of means for receiving over-the-air signals, wherein the system provides for 'smart' switching between antennas based on signal frequency, direction of the signal, signal-to-noise ratio (SNR), packet error rate (PER), bit error rate (BER), gain, and multi-path detection.

BRIEF DESCRIPTION OF THE DRAWINGS

In drawings which illustrate by way of example only a preferred embodiment of the invention.

FIG. 10 is a schematic representation of an electronic programming guide.

DETAILED DESCRIPTION

Figure 1:
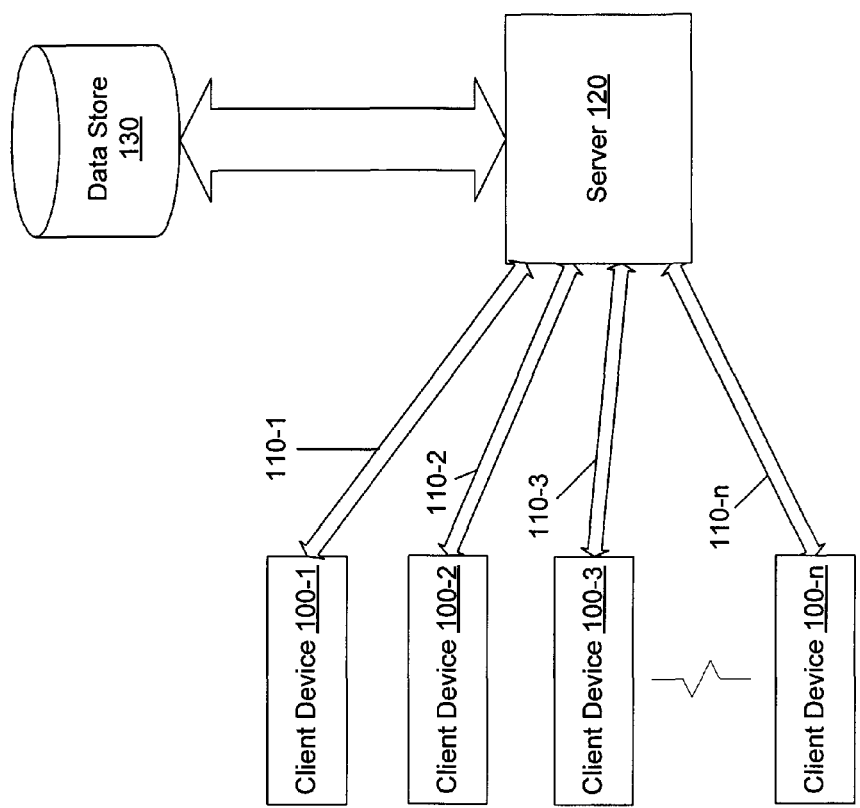
FIG. 1 is a block diagram of a client device and a server according to the invention.
Figure 2:
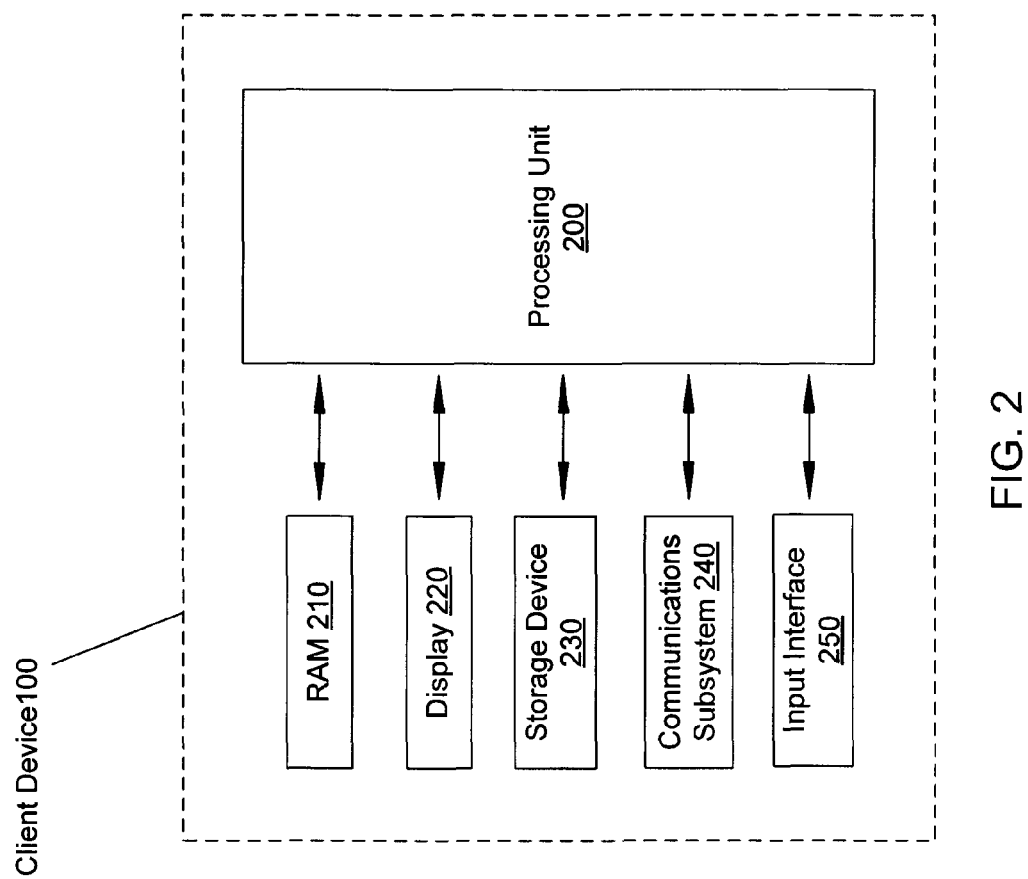
FIG. 2 is a block diagram of a client device according to the invention.

The invention provides a system and method for receiving and distributing an over-the-air audio/video signal. The particular embodiments described herein provide a system and method for receiving an over-the-air signal, retrieving audio/video information from the signal, and processing the information for distribution over a network. The invention will be described primarily in relation to receiving devices comprising client devices 100 (marked as 100-1, 100-2 ... 100-n), and an associated server 120, as illustrated in FIGS. 1 and 2. It will be appreciated by those skilled in the art that client devices may include (without limitation) desktop computers, terminals, laptops, tablets, cellular phones, smartphones, wireless organizers, personal digital assistants, handheld wireless communication devices, wirelessly-enabled notebook computers, television receivers and the like. A server 120 includes (without limitation) any system capable of exchanging messages with client devices 100. It will also be appreciated that the system of the invention may receive signals from other sources in addition to over-the-air broadcasts.

FIG. 1 is a block diagram showing a plurality of client devices 100 and server 120. Client devices 100 may communicate with server 120 via any suitable wired or wireless communications medium 110, for example including but not limited to a Local Area Network (LAN), a Wide Area Network (WAN) including the Internet, a wireless network, and others. Server 120 may comprise, or may be in communication with, a data store 130. Server 120 may store data in and retrieve data from the data store 130.

The data store 130 may be local or remote with respect to server 120. The data store 130 may comprise a database or some other programming construct. For example, the data store 130 may comprise a single relational database or a plurality of databases.

FIG. 2 is a block diagram of an embodiment of a client device 100 for the system of the invention. Client device 100 may comprise processing unit 200, for example a microcontroller, Random Access Memory (RAM) 210, a display 220, a storage device 230, a communications subsystem 240, and an input interface 250. The processing unit 200 controls the overall operation of the client device 100. The RAM 210 is a volatile store which provides for temporary storage of data. The communications subsystem 240 allows client device 100 to communicate with other devices, for example with server 120 either directly or over a network. Storage device 230 may be used to store an operating system and software components, and preferably comprises a persistent store such as flash memory. Input interfaces may include a remote control, a keyboard, a mouse, or any other suitable means for inputting data, including commands.

Figure 3:
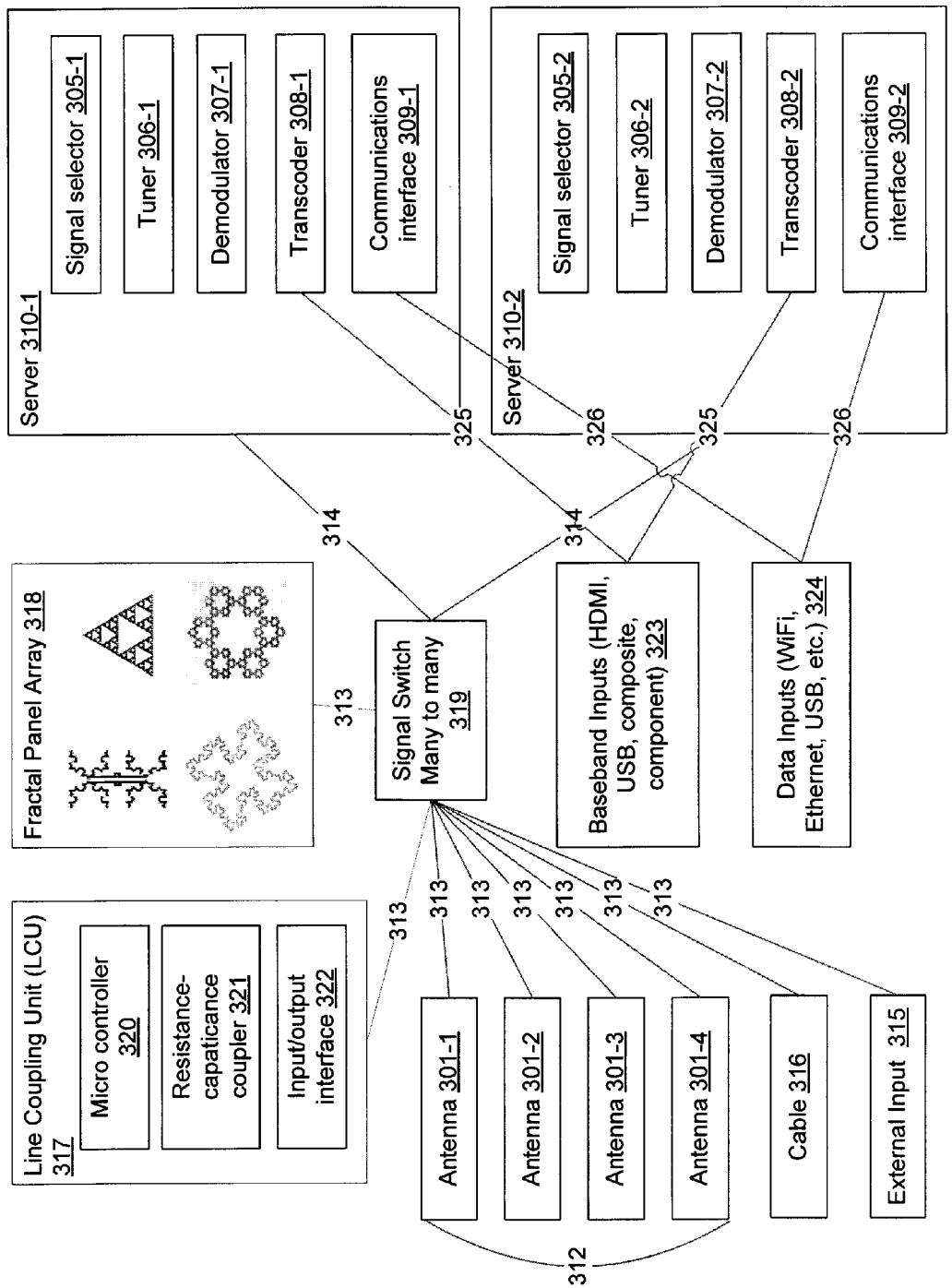
FIG. 3 is a block diagram of a signal reception and distribution system according to the invention.

FIG. 3 illustrates a block diagram of a system for receiving an 'over-the-air' (also sometimes known as 'on-the-air' or 'off-air') signal and distributing selected content of the received signal over a network. The system comprises at least one means for detecting and receiving over-the-air signals comprising video and/or audio content. In the embodiment illustrated in FIG. 3, the system comprises a variety of sources from which to obtain a signal, including a plurality of antennas, in some embodiments including a line coupling unit ("LCU") 317 and baseband inputs such as composite, component, HDMI, USB and other baseband inputs 323, coaxial cable 316 from a CATV service, fractal panel array 318, an external input 315, and data inputs 324, such as Ethernet, USB, WiFi, etc. In this embodiment, the plurality of antennas 312, fractal panel array 318, and LCU 317 are configured to detect and receive over-the-air signals comprising video and/or audio content (with or without ancillary content, for example closed-captioning data, electronic programming guide (EPG) data, etc.) from at least one transmitter (not shown). Typically different video and audio content is encoded on different channels of the transmitted signal. The plurality of antennas 312 may be, for example, an antenna array.

In the embodiment shown, in which a plurality of sources from which to obtain a signal are provided, a signal selector 305 communicates with signal switch 319 to determine the source from which a signal is obtained. Signal selector 305 receives feedback from tuner 306 and demodulator 307 to determine whether a different source ought to be selected. Upon determining that a different source ought to be selected, signal selector 305 instructs signal switch 319 to select that source.

Signal selector 305 may be in constant or intermittent communication with the plurality of signal sources, including the plurality of antennas, in order to continually optimize signal quality. The quality of the signal obtained from each of the sources may vary with time, depending on various external factors. In the event that a selected source no longer provides the best signal amongst the available sources, a different source may be selected when it is detected that the source provides a better signal. For example, in this embodiment the signal selector 305 intermittently, at selected intervals, tests the signal characteristics (e.g. gain at the selected frequency) obtainable from each of the plurality of antennas and preferably other sources fed through the signal selector 305, and may optionally analyze the amount of multipath propagation or signal interference detected, PER, BER, SNR, gain, resolution, data density, signal quality, and other parameters. The feedback may be obtained from the tuner 306 and/or demodulator 307. The signal selector 305 may then select or reject signals from the different sources based, for example, on the amount of multipath propagation or signal interference detected, PER, BER, SNR, gain, resolution, data density, signal quality, and other parameters. Once signal selector 305 selects a source from which to obtain a signal, signal switch 319 provides the signal from the selected source to server 310. The signal selector 305 may select more than one source from the plurality of signal sources for processing in the embodiment with multiple tuners. In the embodiment with multiple tuners, multiple demodulators (or multi channel demodulators) and multiple transcoders are employed.

In the embodiment where only a single source for obtaining signal information is provided, signal selector 305 and signal switch 319 are unnecessary.

In the embodiment shown in FIG. 3, a variety of sources may be used to obtain audio/video signals, including: a line coupling unit 317 ("LCU"), a fractal panel array 318, a plurality of antennas 312, one or more independent antennas 301, a cable television line 316, or some other external input 315. External input 315 may be, for example, a satellite, an outdoor antenna, a video server, a set top box, wireless 3G/4G, or some other external input. In this embodiment, a signal switch 319 is provided for switching between the inputs. Signal switch 319 may be a 'many to many' switch, capable of receiving multiple inputs and outputting multiple outputs. In this example, signal switch 319 is capable of outputting signals to multiple servers 310. Each server 310 may receive a signal from a single source, or they may receive signals from multiple sources.

In a further embodiment (not shown), server 310 may comprise one or more means for detecting an over-the-air signal, including but not limited to a plurality of antennas 312, one or more independent antennas 301, an LCU 317, and a fractal panel array 318. In this embodiment, the signal selector 305 selects one means for detecting an over-the-air signal. Output from the selected means is sent to tuner 306.

Each of the antennas 301 may comprise a fractal printed circuit board antennas or polymer strip line directional antennas, which are known to those skilled in the art. Those skilled in the art will appreciate that any antennas suitable for receiving an over-the-air audio/video signal may be used in a system of the invention. Those skilled in the art will also appreciate that antenna 301 may be adapted to receive any RF input. A fractal element antenna ("FEA") is one that has been shaped in a fractal fashion, either through bending or shaping a volume, or introducing holes. They are based on fractal shapes such as the Sierpinski triangle, Mandelbrot tree, Koch curve, and Koch island. The advantage of a fractal element antenna, as compared to a conventional antenna design, is that they are typically more compact and provide wider bandwidth.

The home wiring antenna comprising Line Coupling Unit (LCU) 317 is preferably capacitively-coupled to the carrier current in the premises' electrical wiring, telephone wiring or any other communications wiring within a wired network, internal or external to a building or enclosure (although the connection to the carrier current may alternatively be inductive). While LCU 317 is advantageously coupled to a home wiring antenna, it may also be coupled with other antenna types. In an embodiment, it has been discovered that it is particularly advantageous to couple LCU 317 to the ground (or earth) wire of the electrical wiring system. Ground wiring has low impedance at low frequencies. For example, the ground wire will be a short circuit at 60 Hz in a typical home electrical system. At higher frequencies (such as at UHF or VHF frequencies), ground wiring has higher impedance and therefore may act as an antenna. Because the ground wire is being used, it is generally safer to use than either the hot wire or the neutral wire because there will be a negligible amount of voltage. The ground wire can be utilized for bi-directional communications.

Figure 11:
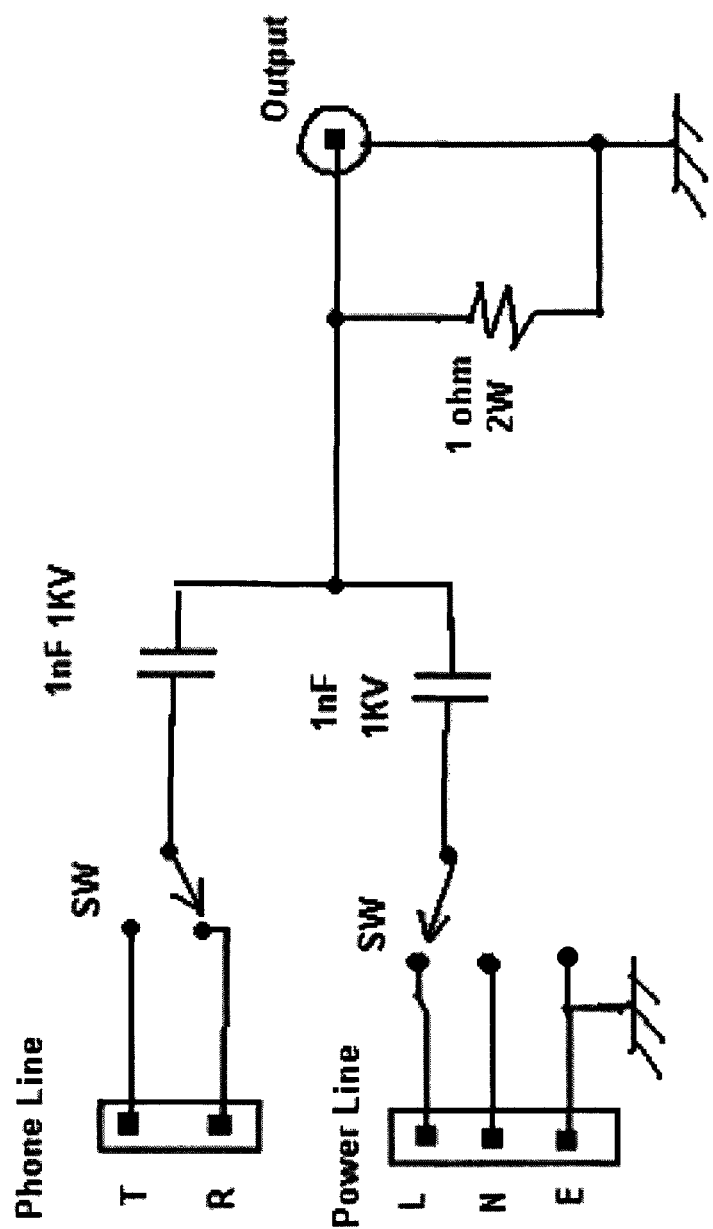
FIG. 11 is a circuit diagram of a passive line coupling unit.

FIG. 11 is a circuit diagram of a passive LCU. In a passive LCU, the capacitance and the resistance are fixed. LCU 317 is preferably an active unit (not shown in FIG. 11) comprising a micro controller 320, a resistance-capacitance coupler 321 ("RC coupler"), and at least one input/output interface 322. Advantageously, the LCU 317 matches impedance on a frequency-by-frequency basis. This is possible because the LCU 317 is coupled directly onto an AC circuit in the premises (for example, a circuit from the mains power supply) in order to ensure that an accurate impedance is provided to the LCU 317, which is critical to obtaining maximum gain. The micro controller 320 may be provided when coupling onto a line where the impedance may change due to load (current), circuit length, and/or devices connected at other network terminations. The micro controller 320 communicates with the server 310 to receive channel selection and frequency information, and based on the information received, controls the RC coupler 321 to change the value in the resistance load in a resistance-capacitance circuit to match the impedance best suited at the frequency selected. The RC coupler 321 may comprise, for example, a high pass filter. The micro controller 320 may be dedicated to the LCU 317, or it may be provided as part of demodulator 307 or transcoder 308 and in communication with the LCU 317. Input/output interface 322 may be USB, Ethernet, or a general purpose input/output. The general purpose input/output, Ethernet, and USB connections may be used to communicate with the micro controller 320 to program, read, write, download upload data. This may be used to set up or control the LCU 317. The LCU 317 is communicating with the signal selector/tuner/demodulator to optimize the RC coupling, adjusting the impedance based on tuner 306/demodulator 307 feedback. In order to accurately match impedance, the server 310 is connected to the LCU. When the line impedance has been accurately matched, the RC coupler 321 compensates accordingly to achieve the maximum gain.

Figure 13:
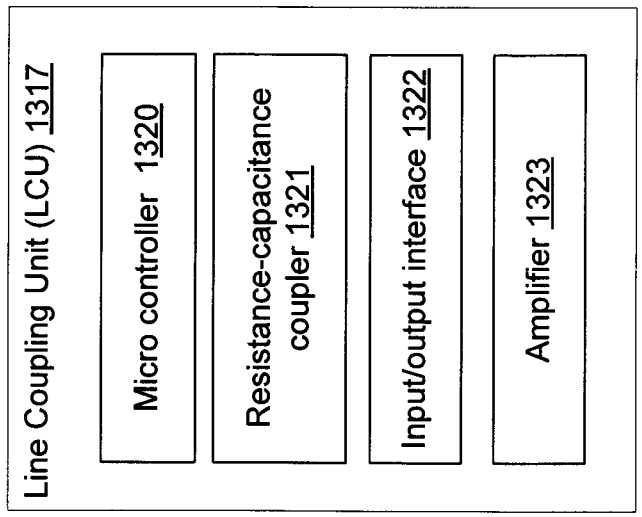

FIG. 13 illustrates a further embodiment of an active LCU, which comprises an amplifier 1323. Amplifier 1323 amplifies the signal received from by the antenna coupled with LCU 1317, providing a boosted signal to the tuner 306 and the rest of the system for further processing. Amplifier 1323 preferably requires very little current to operate. For example, in a preferred embodiment, amplifier 1323 would require less than 10 mA to operate. Due to the low amount of electrical current required to operate amplifier 1323, in some applications, it may be powered by an inductive power source. For example, where LCU 1317 is coupled to an electrical wiring system, an inductive power source may be coupled with a hot or live line connected to or forming part of the mains power supply. Although the inductive power source is coupled with the hot line, it is not directly in contact with the electrical conductor. Instead, the power source is spaced or insulated from the hot line, but close enough such that the magnetic field generated by the current passing through the conductor induces a current in the power source inductor. The resulting flow of current in the power source may be used to charge a battery and/or to power the amplifier 1323. In a further embodiment, a battery may be provided for storing electrical charge generated from the induction power source, either as a primary power source for the amplifier 1323 or as a backup power source. In operation, the amplifier 1323 may draw electrical current from the battery instead of directly from the power source. In a preferred embodiment, LCU 1317, amplifier 1323, and the power source may be housed in a wall wart that may be plugged into an electrical outlet. Those skilled in the art will appreciate that other means may be used for housing LCU 1317, amplifier 1323 and the power source.

In the embodiment shown in FIG. 3, server 310 comprises a signal selector 305, a tuner 306, a demodulator 307, a transcoder 308, and a communications interface 309. Once the signal switch 319 selects a source from which to obtain a signal, signal switch 319 outputs the signal from the selected source to the server 310 via communications medium 314. Signal switch 319 is preferably a multiple input, multiple output device. Tuner 306 of server 310 processes the output from signal switch 319 by changing the signal to an intermodulated frequency. By changing the signal to an intermodulated frequency, typically down to baseband so that a baseband demodulator can be used for more efficient processing at that frequency, as is known to those skilled in the art. Output from baseband inputs 323 may be delivered to server 310 via communications medium 325. Output from baseband inputs 323 may be provided to the transcoder 308 for transcoding. Output from data inputs 324 may be delivered to server 310 via communications medium 326. Output from the data inputs 324 may be provided to the communications interface 309 for redistribution throughout the network.

Server 310 may be co-located with the plurality of antennas 312, or it may be remote from the plurality of antennas 312. By placing server 310 in close proximity with the plurality of antennas 312, signal loss may be minimized. However, in some scenarios it may be desirable to place the plurality of antennas 312 remote from the server 310, as the server 310 may not be in a location which provides maximum reception.

In another embodiment, server 310 may itself comprise an antenna 301. In this embodiment, output from antenna 301 may be sent to tuner 306.

The output from the selected means for providing a signal comprises many channels. Tuner 306 is configured to isolate the portion of the output which is associated with a selected channel (i.e. a frequency), producing an intermodulated carrier wave which carries the data associated with the selected channel. Signal quality parameters such as PER, BER, SNR, gain, signal strength, and multi-path detection are obtained from the tuner and demodulator and are compared by a lookup table in order to determine and select the best signal and send the instruction to the signal switch 319 to select the appropriate antenna. The system will preferably constantly or intermittently monitor the output to reduce multipath and ghosting. In one embodiment, tuner 306 is configured to receive a vestigial side band (8VSB) signal, for example as defined in the Advanced Televisions Systems Committee (ATSC) standards. 8VSB is the current standard by which television signals are transmitted over the air. Those skilled in the art will appreciate that other standards may be used to transmit television signals and that tuner 306 may be configured to work with any such standards.

For example, tuner 306 may be configured to receive a Quadrature Amplitude Modulation (QAM) signal, which is the current standard used for delivering a television signal over coaxial cable. In this embodiment, server 310 may be provided with a means adapted to receive a signal from coaxial cable (not shown). In this way, server 310 may be used to receive both over-the-air signals and cable signals.

In a further embodiment, server 310 comprises more than one tuner 306. The function of a tuner 306 is to isolate from an over-the-air signal a modulated carrier wave for a selected channel within the over-the-air signal. With a single tuner 306, server 310 would only be able to distribute a video stream for a single channel. By providing for additional tuners 306 in the server 310, a first client device 100-1 may request a first channel while additional client devices 100-2, 100-3 through 100-N may request different channels. In this embodiment, each tuner 306 has an associated demodulator 307 and transcoder 308 operating in accordance with the invention.

Tuner 306 produces an intermodulated carrier wave associated with the selected channel and outputs the carrier wave to demodulator 307. Demodulator 307 is configured to demodulate the intermodulated carrier wave. Demodulator 307 extracts the information from the tuner output signal and encodes the information into a first format, for example a digital video format. Techniques for demodulation to extract information from an intermodulated carrier wave are well known to those skilled in the art.

In one embodiment, demodulator 307 may convert information recovered from the tuner output signal to an MPEG2 format, which is a current standard for the generic coding of moving pictures and associated audio information. The resulting data stream in this first signal format may then output to transcoder 308.

Transcoder 308 receives the output from demodulator 307 and encodes the demodulator output into a data stream in a second format. The demodulator output may for example be encoded into a second video format. The second video format may be in a standard format such as MPEG4 (H.264). In this embodiment, the output from demodulator 307 is transcoded by the transcoder 308, resulting in a transport stream that requires less bandwidth for distribution over the network.

In a further embodiment, a data stream in a second video format may be produced directly from the information extracted from the demodulator 307 output signal.

The data stream in a second format (either output from transcoder 308 or extracted directly from the demodulator 307 output signal) is packaged in a format suitable for transport over the network by communications interface 309 or some other suitable processing means to produce a network transport stream, as is well known. Communications interface 309 may send the network transport stream to other members of a network (not shown) via communications medium 110. The network transport stream may be in any suitable network protocol. For example, the network transport stream may be in the Transmission Control Protocol/Internet Protocol (TCP/IP) format. Communications medium 110 may be wired, or wireless.

Figure 4:
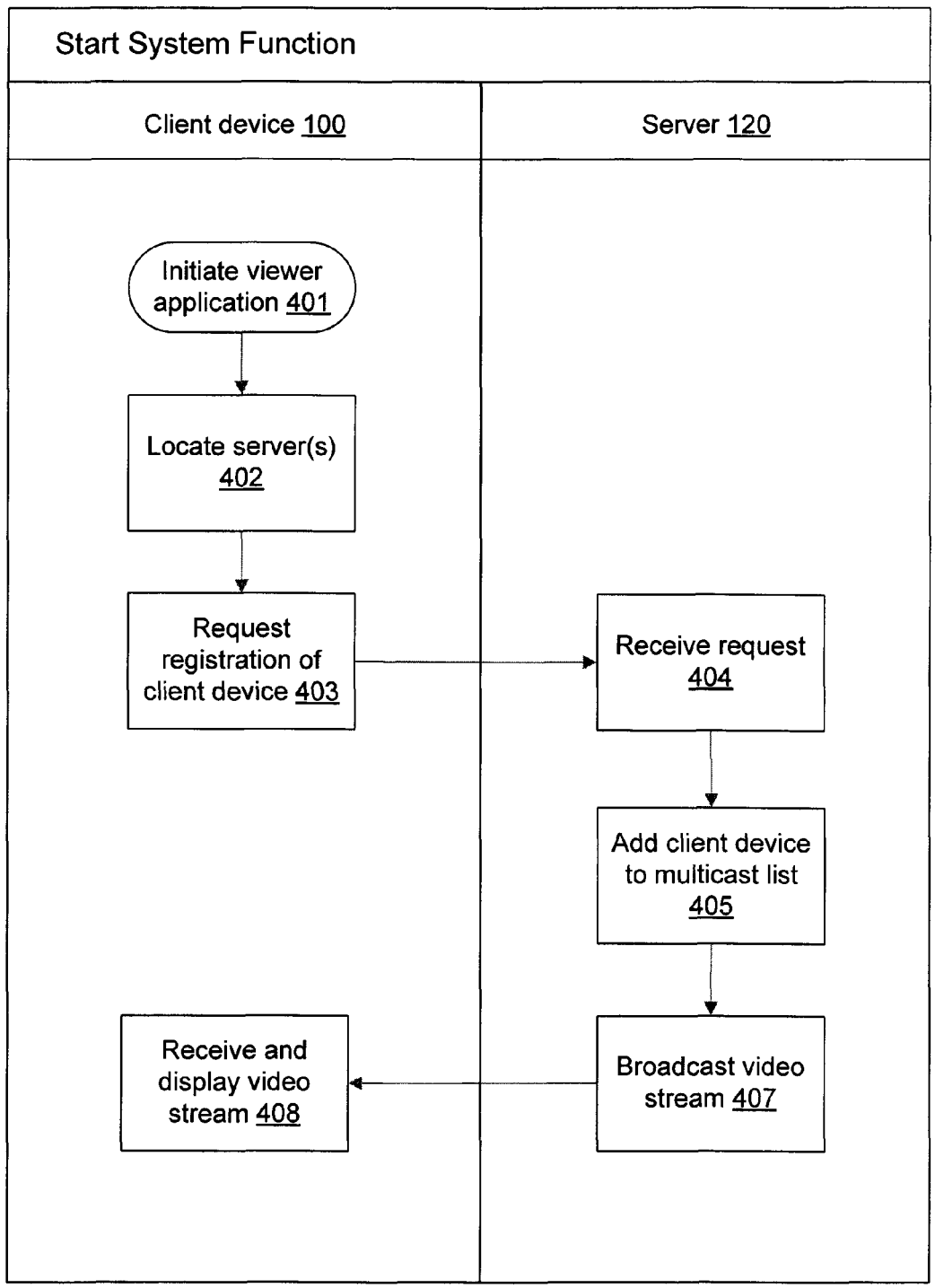
FIG. 4 is a flowchart of a process for displaying video on a client device.

FIG. 4 illustrates a method for initiating a signal distribution system according to the invention. In this embodiment, client device 100 initiates a viewer application at 401. Viewer application may be a browser, a widget, a browser plug-in, or some other program construct for rendering video. The viewer application initiates a search for the server 120 over a network at 402. If more than one server 120 is located, the viewer application may connect to a default server 120 (if defined) or the user may be asked to select a preferred server 120. To connect with server 120, client device 100 initiates a request to be registered with server 120 at 403. Server 120, receiving the viewer application request at 404, adds client device 100 to a multicast list at 405. A multicast list may have a plurality of client devices registered. Server 120 may broadcast a video stream to all client devices 100 registered on the multicast list at 407. Client device 100 receives the broadcasted video stream and displays it on a display 220 of the client device 100 at 408.

Figure 5:
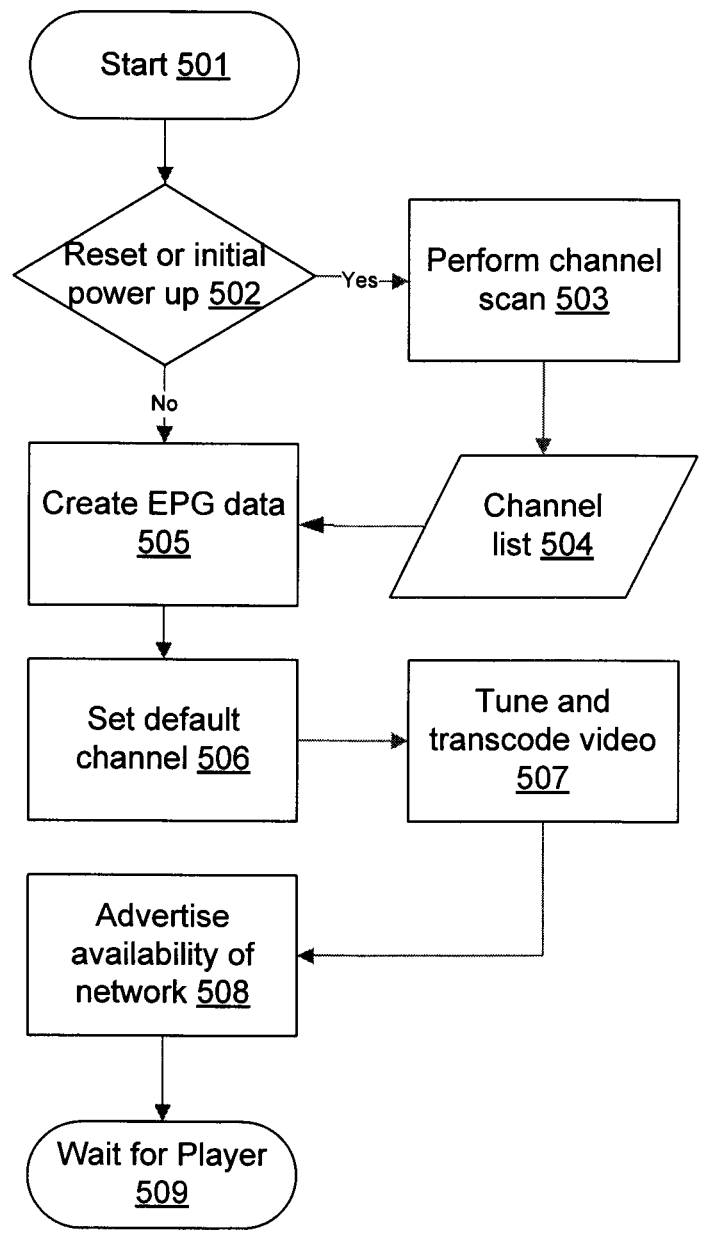
FIG. 5 is a flowchart of a process for initializing a signal reception and distribution system in a system according to the invention.

FIG. 5 illustrates a method for initializing the server 120. On power up or reset server 120 runs an initial boot-up sequence at 501. A check is performed to determine whether this is the first time that server 120 is operating at 502. If server 120 has never operated in the past, then tuner 306 performs a scan across all channels to detect the presence of an over-the-air signal at 503. In other embodiments, tuner 306 may perform a scan based on a user request, at selected time intervals, or upon detection of pre-defined events. Once a channel scan is complete, information associated with a list of available channels is stored in a data store 130 of server 120 at 504. This information may include the frequency of the channel, the quality of the signal associated with the channel, and other meta or ancillary data associated with the channel. Meta or ancillary data may include (without limitation) such parameters as: preferred antenna and impedance switch values; as well as signal scan parameters such as PER, BER, SNR, gain, signal strength, and multi-path detection. The signal scan parameters may be used to compare initial scan parameters with the current signal to determine if a re-scan of the input signal is required. Meta data or ancillary data associated with the channel may be retrieved from the signal, it may be pre-defined, or it may be retrieved by some other means (for example, over the network). Using this information, an electronic programming guide (EPG), such as shown in FIG. 10, may be generated at 505. The guide includes but is not limited to information pertaining to the content being delivered and the scheduling of the content being delivered.

The data used to populate the EPG may be retrieved from the over-the-air signal or over the network. In one example, server 120 may access the internet or some other data store over the network to retrieve the data. Once the EPG has been generated, the tuner 306 is set to receive a default channel at 506. Once the default channel has been set, the tuner 306 isolates the information in a signal associated with the default channel to produce an intermodulated carrier wave, the intermodulated carrier wave is then demodulated to a data stream in a first format by the demodulator 307, and in the embodiment shown transcoded to a data stream in a second format by the transcoder 308 in preparation for distribution over a network at 507. Prior to distribution over the network, data in the second format may be packaged in a standard network transport protocol, such as TCP/IP (the set of protocols which enable computers to communicate over the Internet) to produce a network transport stream. Availability of the server 120 is then broadcast over the network at 508. In another embodiment, server 120 may respond to a request from a client device 100 by indicating its availability. At 509 server 120 waits for a communication from a client device 100.

Figure 6:
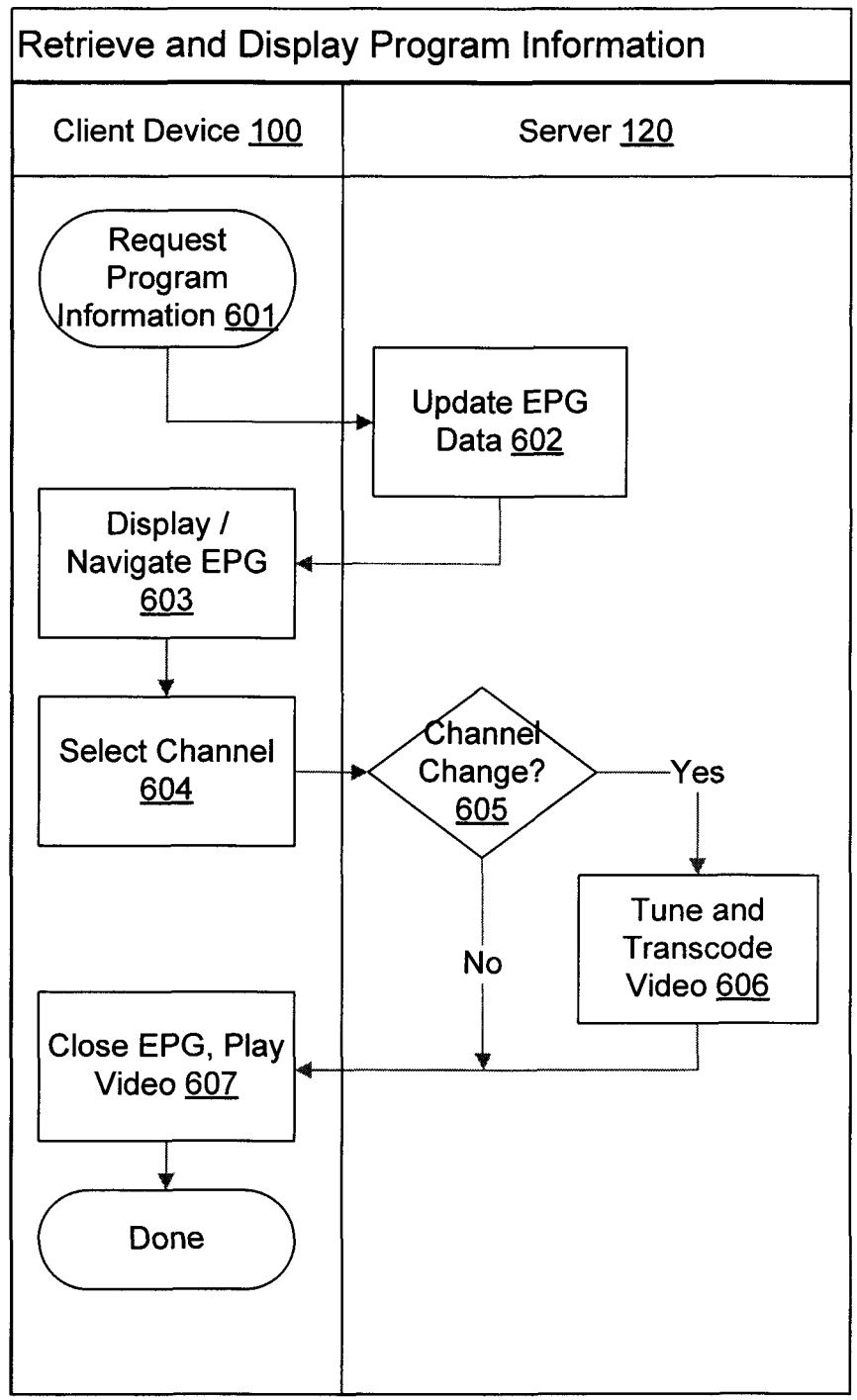
FIG. 6 is a flowchart of a process for retrieving and displaying electronic programming information on a client device.

FIG. 6 illustrates a method for retrieving and displaying an electronic programming guide. In this embodiment, client device 100 is processing data from server 120 to render video associated with a selected or default channel. Client device 100 may request an electronic programming guide from server 120 at 601. Server 120 may update the stored electronic programming guide information and send the electronic programming guide information to client device 100 at 602. In another example, electronic programming guide information may be sent to client device 100 without updating the information. Client device 100 receives the electronic programming guide data and renders a view based on the information on display 220 at 603. A user operating the client device 100 may navigate the electronic programming guide information at 603. FIG. 10 is an example of an electronic programming guide. A user may select a channel to be displayed on client device 100 at 604. The user-selected channel is sent from client device 100 to server 120. Server 120 may determine whether the user-selected channel is the same as the channel that tuner 306 is currently tuned to at 605 (the original channel). If server 120 determines at 605 that the user-selected channel is different from the original channel, then tuner 306 may produce an intermodulated carrier wave associated with the user-selected channel which is then demodulated to a data stream in a first format by demodulator 307 and in the embodiment shown transcoded to a data stream in a second format by transcoder 308 at 606. The data stream in the second format is then packaged to produce a network transport stream and delivered to client device 100 where it is processed to render video on display 220 of client device 100 at 607. If server 120 determines at 605 that the selected channel is the same, no changes need to be made and tuner 306, demodulator 307, and transcoder 308 continue to deliver a network data stream with content from the original channel over the network to client device 100 which is processed to render video on display 220 of client device 100 at 607.

Figure 7:
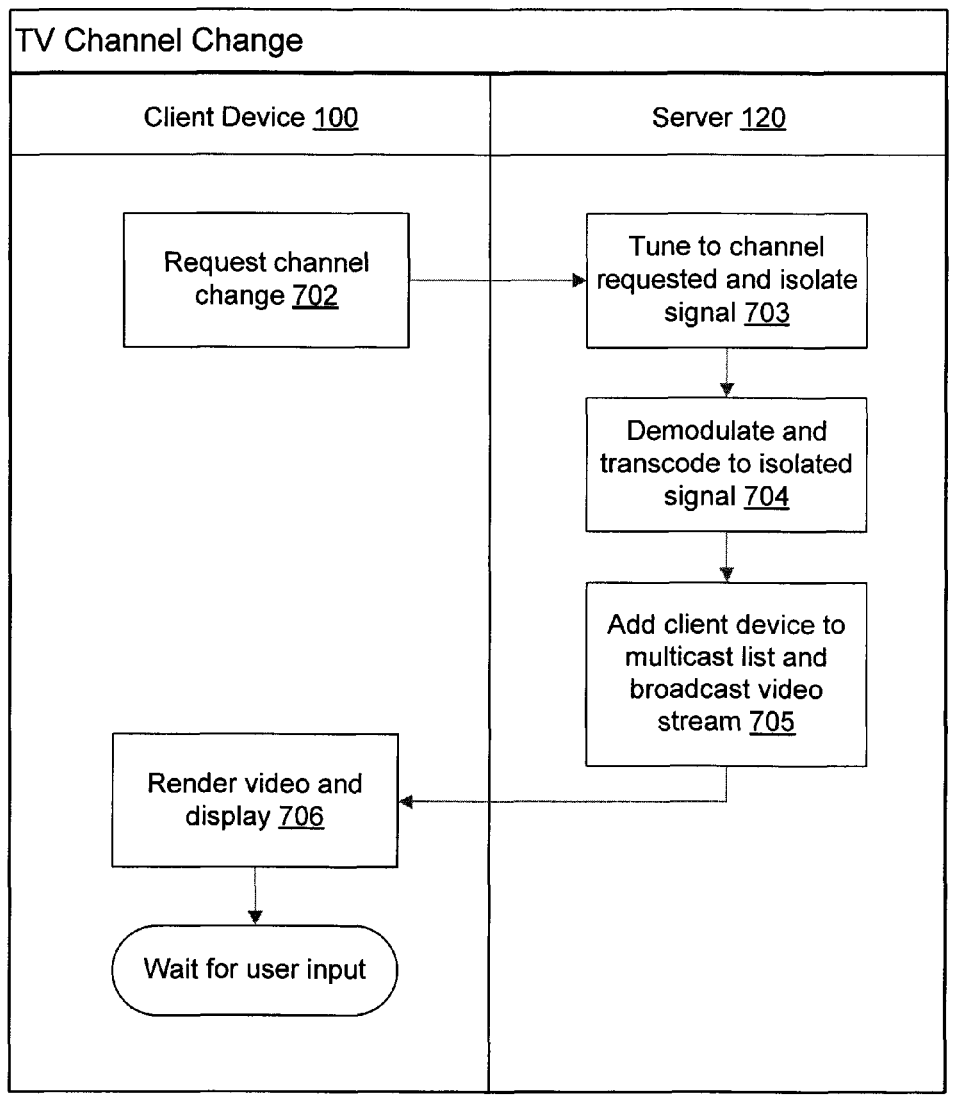
FIG. 7 is a flowchart of a process for changing the channel to be displayed on a client device.

FIG. 7 illustrates a method for changing channels. A user may request a channel change at a client device 100 at 702. This request may be transmitted to server 120. A user may request a change to the next/previous channel or a user may request a change to a channel not previously selected. Server 120 requests that the tuner 306 change the new user-selected channel at 703. Tuner 306 tunes to the user-selected channel to produce an intermodulated carrier wave associated with the user-selected channel at 703. The intermodulated carrier wave is then demodulated to produce a data stream in a first format and transcoded to produce a data stream in a second format at 704. The data stream in a second format is packaged to produce a network transport stream.

If not on the list already, client device 100 may be added to a multicast list and server 120 broadcasts a video stream encoded in a second format to all devices on the multicast list by delivering the network transport stream over the network at 705. In a further embodiment, broadcast over a network may be implemented using UDP, or some other suitable network protocol. Client device 100 receives the network transport stream and, upon processing the transport stream, renders the video on display 220 at 706.

Figure 8:
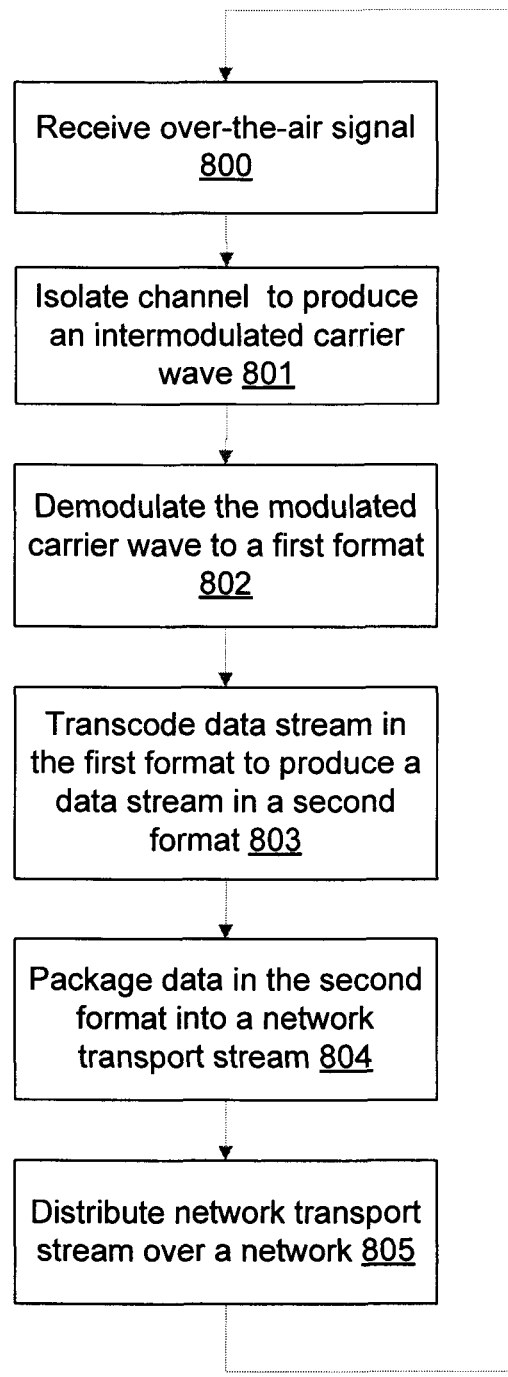
FIG. 8 is a flowchart of a process for producing a network transport stream from an over-the-air signal.

FIG. 8 illustrates a method converting an over-the-air signal to a video stream that may be distributed over a network. An over-the-air signal is received by a one or more independent antennas 301 or a plurality of antennas 312 at 800. Signal information associated with a selected channel is isolated from the over-the-air signal to produce an intermodulated carrier wave which is associated with a selected channel at 801. The isolated signal information is demodulated to produce a data stream in a first format 802. The data stream in a first format is transcoded into a data stream in a second format 803. The data stream in the second format is packaged into data in a standard network transport protocol to produce a network transport stream at 804. The network transport stream is distributed over a network to at least one client device 100 at 805. The network transport stream received at client device 100 may then be unpackaged and rendered by a viewer application for display in a display 220. In a further embodiment, step 803 may be omitted and the data stream in a first format may be packed into data in a standard network transport protocol to produce a network transport stream. In this embodiment, bandwidth and client device 100 must be sufficient to deliver and render the data in a first format.

The data stream may be delivered to client devices by over-the-air broadcast, coaxial cable, wireless network, fiber, Ethernet cable, twisted pair, and any other suitable transmission medium; may be transmitted in any suitable protocol including without limitation Internet Protocol (IP) with or without compression; and may be combined with or isolated from other signals via signal multiplexing, switched digital video or other band selection/combining techniques.

Figure 9:
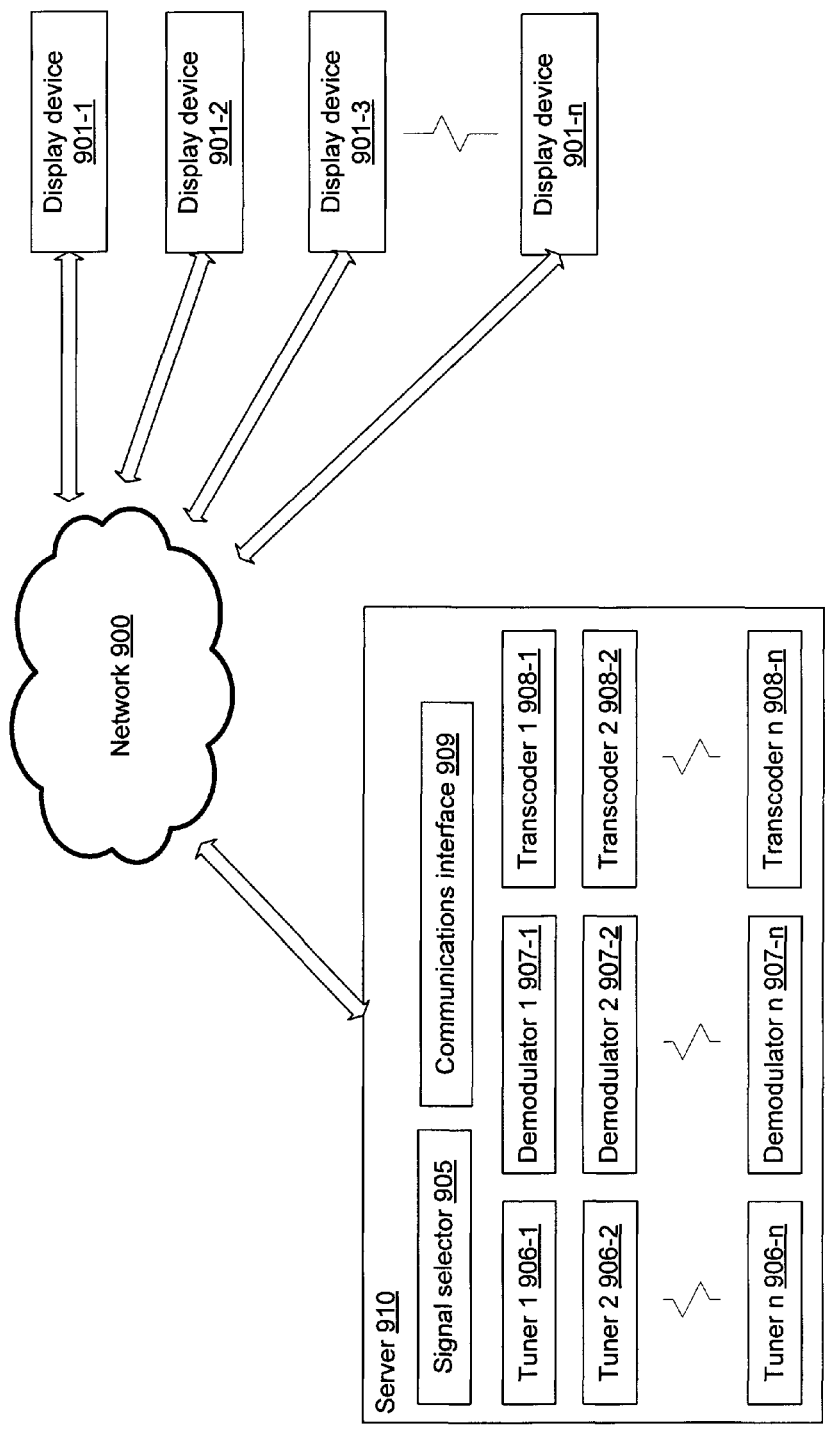
FIG. 9 is a block diagram of a further embodiment of a signal reception and distribution system according to the invention.

FIG. 9 illustrates a block diagram of a further embodiment of a system for receiving an 'over-the-air' (also sometimes known as 'on-the-air' or 'off-air') signal and distributing selected content of the received signal over a network. In this embodiment server 910 comprises a signal selector 905, a plurality of tuners 906, a demodulator 907 for each of the plurality of tuners 906, a transcoder 908 for each of the plurality of demodulators 907, and at least one communications interface 909. Server 910 is configured to receive signals from one or more signal sources (for example, cable (CATV), antenna, a plurality of antennas, LCU, and the like). The signal selector 905 in conjunction with a signal switch (not shown) selects one or more sources from which to obtain one or more signals. Each of the plurality of tuners 906 is configured to isolate the portion of the signal associated with a selected channel (i.e. frequency), producing an intermodulated carrier wave which carries the data associated with the selected channel. Each of the plurality of tuners 906 has an associated demodulator 907 for demodulating the intermodulated carrier wave, producing a plurality of data streams in a first format. Each of the demodulators 907 has an associated transcoder 908 for encoding the demodulator output data stream in the first format into a data stream in a second format, producing a plurality of data streams in a second format. Each of the data streams in a second format may be sent via communications interface 909 to one or more of the plurality of display devices 901. In this way, display devices may display different channels from a single signal source, or they may display different channels from more than one signal source.

Display devices 901 or client devices 100 comprise a means for receiving and unpacking a network stream into an audio/visual data stream. For example, recent gaming systems (Xbox (Trademark) from Microsoft, PS3 (Trademark) from Sony) are capable of performing such functions and may be advantageously used in conjunction with the systems described herein.

Figure 12:
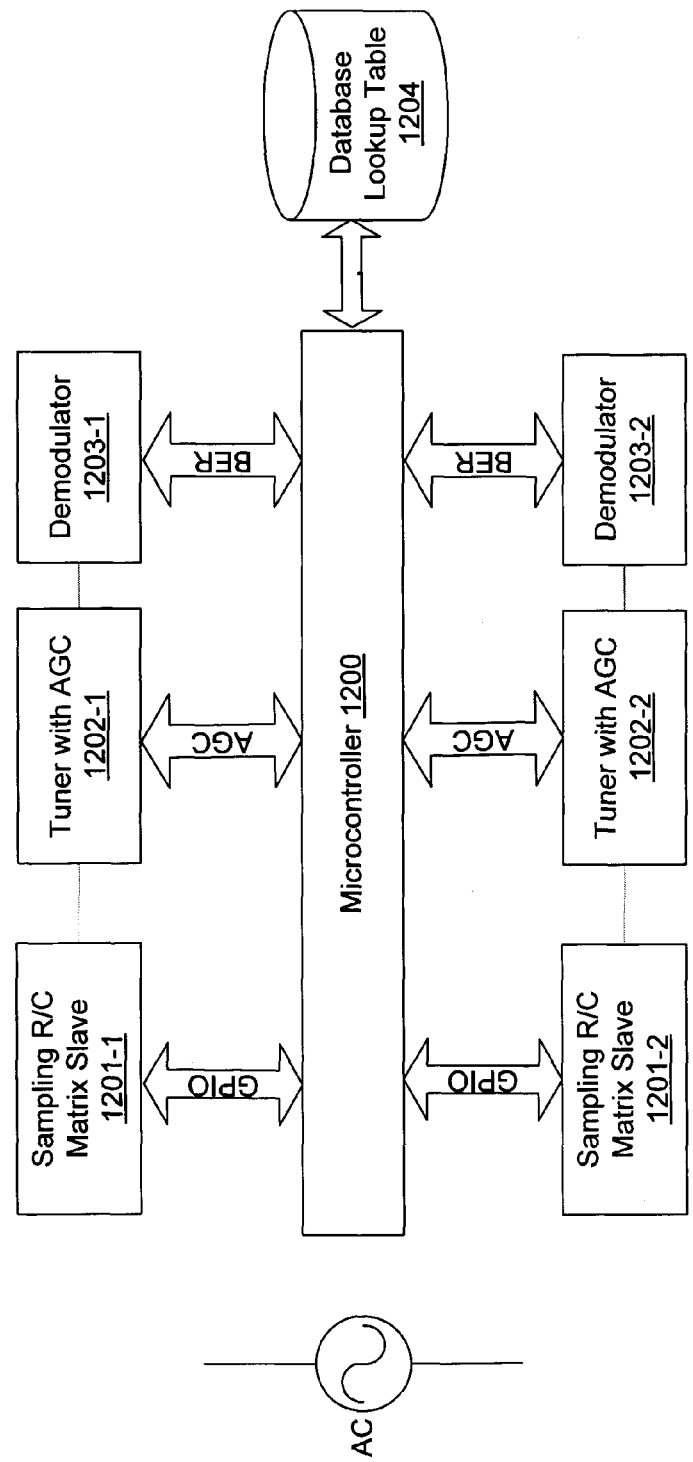
FIG. 12 is a block diagram of a further embodiment of a signal reception and distribution system according to the invention.

FIG. 12 illustrates a block diagram of a further embodiment of the invention. In this embodiment, a plurality of sampling R/C matrix slaves 1201 are provided for coupling to an A/C circuit or some other antenna. For each slave 1201, a tuner 1202 and demodulator 1203 are provided. Note that while two of each slave 1201, tuner 1202 and demodulator 1203 are illustrated as an example in FIG. 12, more than two of each may be provided without departing from the concept of the invention. In this example, when the system is initialized, the system samples the signal for each channel across the frequency spectrum to determine the appropriate resistance and capacitance values for each channel. When a channel is being sampled (i.e., the tuner 1202 tunes to the sampled channel), micro controller 1200 instructs slave 1201 to change resistance or capacitance values, or both, over a defined range. As the resistance/capacitance values are changed, micro controller 1200 retrieves signal quality parameters such as PER, BER, SNR, gain, signal strength, and multi-path detection from the tuner 1202 and demodulator 1203 respectively, and detects the resulting signal of the best quality to determine the ideal resistance/capacitance values to use for the sampled channel. Those skilled in the art will appreciate that adjusting the resistance and capacitance values of the circuit is only one technique for matching impedance. Other techniques of impedance matching are well known to those skilled in the art.

In one embodiment, once the micro controller 1200 determines the ideal resistance/capacitance values for the sampled channel, the values are stored in the database lookup table 1204 and the micro controller instructs the tuner 1202 to sample the next channel. This process is repeated until resistance/capacitance values are obtained and stored in the database 1204 for each channel. Where two or more slaves 1201, tuners 1202, and demodulators 1203 are provided, each of the tuners 1202 may simultaneously and independently sample different channels. Once database 1204 has been populated, when a tuner 1201 selects a channel, resistance and capacitance values are retrieved from database 1204 and supplied to the slave 1201—slave 1201 then modifies the resistance/capacitance values based on the values retrieved from the database 1204 to optimize the signal for that channel. This avoids the need to repeat the sampling procedure each time a channel is selected. However, because signal quality may change from time to time depending on external factors, it would be advantageous to periodically sample each channel to determine whether values stored within the database 1204 still provide the maximum gain for that channel.

The embodiment illustrated in FIG. 12 is most advantageous for coupling to home wiring such as an A/C circuit, but may also be coupled to some other antenna. In this embodiment, the quality of the signal is determined and compared with the quality of signals from other sources by the signal selector 305 for a selected channel. Once impedance has been matched by the LCU 317, signal selector 305 may then select the best signal source for obtaining a signal for a selected channel, and instructs signal switch 319 to switch to the selected channel.

Various embodiments of the subject matter herein having been thus described in detail by way of example, it will be apparent to those skilled in the art that variations and modifications may be made without departing from the subject matter described herein. The invention includes all such variations and modifications as fall within the scope of the appended claims.

For example, it should be understood that the steps and the order of the steps in the processing described herein may be altered, modified, and/or augmented and still achieve the desired outcome. It will also be appreciated that although the embodiments herein have been directed generally to processing of over-the-air television signals, similar systems and methods may be carried out in respect of processing of other types of signals, such as audio content over radio, audio/video content over cable and the like.

Programming code may be adapted to provide the systems and methods described above. The code may be provided on many different types of computer-readable media including computer storage mechanisms (e.g., CD-ROM, diskette, RAM, flash memory, computer's hard drive, etc.).

The data may be stored in one or more data stores. The data stores may be of many different types of storage devices and coded constructs, such as RAM, ROM, flash memory, programming data structures, programming variables, etc. Data structures may be described as formats for use in organizing and storing data in databases, programs, memory, or other computer-readable media for use by a computer program.

The computer components, software modules, functions and data structures described herein may be connected directly or indirectly to each other in order to allow the flow of data needed for their operations. It is also noted that a module or processor includes but is not limited to a unit of programming code that performs a software operation, and can be implemented for example as a subroutine unit of code, or as a software function unit of code, or as an object (as in an object-oriented paradigm), or as an applet, or in a computer script language, or as another type of computer code.

We claim:

1. A system for receiving and distributing an over-the-air signal over a network, comprising:
   at least one input comprising an antenna for receiving an over-the-air signal containing a plurality of channels;
   at least one other input;
   a signal selector, for monitoring a signal output by each of the antenna and the at least one other input and selecting as a signal source whichever one of the antenna and the at least one other input provides the best quality of signal.

2. A system for receiving and selecting an over-the-air signal, comprising:
   at least one input comprising an antenna for receiving an over-the-air signal containing a plurality of channels;
   at least one other input for receiving the same over-the-air signal or a different over-the-air signal containing at least one of the plurality of channels;
   a signal selector, for monitoring a signal output by each of the antenna and the at least one other input and selecting as a signal source whichever one of the antenna and the at least one other input provides the best quality of signal.

3. A system for receiving and selecting at least one signal, comprising:
   at least one input comprising an antenna for receiving a signal containing at least one channel containing content;
   at least one other input for receiving the signal, or for receiving a different signal containing the at least one channel or a different channel containing the content;
   a signal selector, for monitoring a signal output by each of the at least one input and the at least one other input, and selecting whichever one of the at least one input and the at least one other input provides the best quality of signal containing the content.

4. The system of claim 3 wherein the at least one input comprises at least one tuner coupled to the antenna for isolating from the at least one signal the at least one channel containing the content.

5. The system of claim 4 wherein the at least one signal comprises at least one other channel containing the content and the at least one other input comprises at least one other tuner coupled to the antenna for isolating from the at least one signal the at least one other channel containing the content.

6. The system of claim 4 wherein the antenna receives at least one other signal comprising at least one channel containing the content and the at least one other input comprises an additional tuner coupled to the antenna for isolating from the at least one other signal the at least one channel containing the content.

7. The system of claim 4 wherein the at least one other input comprises at least a second antenna for receiving the at least one signal, and a tuner coupled to the at least second antenna for isolating from the at least one signal the channel containing the content or another channel containing the content.

8. The system of claim 3 wherein the at least one signal is an analog signal.

9. The system of claim 3 wherein the at least one signal is a digital signal.

10. The system of claim 3 wherein the at least one signal contains a single channel.

11. The system of claim 5, wherein the at least one channel and the at least one other channel are monitored at outputs of the tuners.

12. The system of claim 4 comprising at least one demodulator, wherein the signal selected from the at least one input or from the at least one other input is demodulated for distribution.

13. The system of claim 12 wherein signals output from one or both of the at least one input and the at least one other input are monitored at an output of the at least one demodulator.

14. The system of claim 13, wherein signals output from one or both of the at least one input and the at least one other input are monitored at an output of the at least one tuner.

15. The system of claim 4 wherein the antenna is an antenna array, a fractal element antenna, a fractal array, a plurality of independent antennas, or a single antenna.

16. The system of claim 4 comprising at least one line coupling unit (LCU) coupled between the antenna and the tuner for matching an impedance of the antenna.

17. The system of claim 16 comprising a memory for storing LCU resistance or capacitance values, or both, for at least one channel, for retrieval when the at least one channel is selected.

18. The system of claim 16 wherein the antenna comprises a line of a local mains power supply network.

19. The system of claim 18 wherein the line comprises a ground wire.

20. The system of claim 4 comprising a plurality of tuners for distributing a plurality of output signals from the signal selector.

21. A method for receiving and selecting at least one channel containing content, comprising the steps of:
   a. receiving a signal containing the at least one channel;
   b. receiving a different signal containing the at least one channel or a different channel containing the content;
   c. monitoring the signals, and
   d. selecting the signal which provides the best quality of channel containing the content.

22. The method of claim 21 wherein the signals are monitored intermittently.

23. A method for receiving and selecting at least one channel containing content, comprising the steps of:
   a. receiving a signal containing the at least one channel and at least one other channel containing the content;
   b. monitoring each of the channels, and
   c. selecting whichever one of the channels provides the best quality.

24. The method of claim 23 wherein the signals are monitored intermittently.

25. A system for receiving and selecting a signal comprising at least two channels containing the same content, comprising:
   at least one signal source, for receiving the signal;
   at least one tuner coupled to the at least one signal source, for isolating from the signal each of the at least two channels carrying the content; and
   a signal selector, for monitoring a quality of the signal output by the at least one tuner at frequencies corresponding to each of the at least two channels carrying the content, and selecting whichever one of the at least two channels provides the best quality of signal.

26. The method of claim 25 wherein the at least two channels are monitored intermittently.

27. A method of populating a data store in a system for receiving and distributing an over-the-air signal over a network,
   the system comprising at least one antenna for receiving an over-the-air signal containing a plurality of channels, at least one line coupling unit (LCU) coupled to the at least one antenna for adjusting a resistance or a capacitance, or both, of the coupling to the at least one antenna, at least one tuner for isolating, from the over-the-air signal, signal information associated with a selected channel, the tuner producing a carrier wave associated with the selected channel, at least one demodulator for demodulating the carrier wave to produce a data stream in a first format, a communications interface for producing a network transport stream from the data stream format and for distributing the network transport stream over the network, and a data store for storing a resistance value or a capacitance value, or both, for each of the plurality of channels,
   the method comprising the steps of:
      (a) tuning to one of the plurality of channels;
      (b) adjusting the resistance or the capacitance of the LCU, or both, through a range of values;
      (c) for each resistance or capacitance value, detecting at least one parameter of the signal; and
      (d) storing the resistance or capacitance value, or both, which optimize the at least one parameter.

28. A method of populating a data store in a system for receiving and selecting a signal,
   the system comprising at least one antenna for receiving at least one signal containing at least one channel, at least one line coupling unit (LCU) coupled to the at least one antenna for adjusting a resistance or a capacitance, or both, of the coupling to the at least one antenna, at least one tuner for isolating, from the at least one signal, signal information associated with the at least one channel, the tuner producing a carrier wave associated with the at least one channel, and a data store for storing a resistance value or a capacitance value, or both, for the at least one channel,
   the method comprising the steps of:
      (a) tuning to the at least one channel;
      (b) adjusting the resistance or the capacitance of the LCU, or both, through a range of values;
      (c) for each resistance or capacitance value, detecting at least one parameter of the signal; and
      (d) storing the resistance or capacitance value, or both, which optimize the at least one parameter.

29. The method of claim 28 wherein the at least one antenna comprises a line of a local mains power supply network.

30. The system of claim 29 wherein the line comprises a ground wire.

* * * * *